Patented Apr. 13, 1954

2,675,340

UNITED STATES PATENT OFFICE 2,675,340

ANALGESIC COMPOSITION

Karl S. Pilcher, Albany, and Victor P. Seeberg, Berkeley, Calif., assignors to Cutter Laboratories, Berkeley, Calif., a corporation of California No Drawing. Application July 5, 1951,
Serial No. 235,378

2 Claims. (Cl. 167—55)

This invention relates to and has for its object the provision of a quickly acting analgesic operating at a substantially constant and high analgesic level for an extended period.

It is generally accepted that analgesic agents act by raising the threshold of pain sensitivity of the central nervous system, or more specifically, the brain. In fact, the locus of this action is traced even more specifically to a fairly well-defined anatomical area known as the pain perception center of the brain. To effect such an action, the agents must actually reach and come in physical contact with the cells of the brain. The intensity of the effect of any given analgesic is proportional to the concentration of that analgesic in the brain tissue. Following oral administration, aspirin (the acetyl ester of salicylic acid) is absorbed and to a large extent becomes bound to the serum proteins. During and following the absorption process, a large part of the apirin is hydrolyzed to salicylate, and the resulting salicylate exhibits the same degree of protein binding and the same degree of analgesia as does aspirin. Therefore, in subsequent discussion, when we speak of the concentration of aspirin or the analgesic action of aspirin after absorption into the blood, we are referring to the effects of the resulting mixture which is mostly salicylate and partly aspirin. Because of its binding with serum protein, aspirin penetrates into the other body fluids only very slowly and as a consequence a half hour or so elapses before any sizable concentrations of its appear in the brain tissue. Maximum concentration in the brain tissue is not reached until three of four hours after administration. This delayed type of action appears to be common to all analgesic agents of the salicylate type now on the market and for obvious reasons is undesirable.

To produce a quickly acting analgesic, capable of producing a sustained, substantially constant and high level analgesic action in accordance with our invention, we simply mix about equal quantities of the acetyl ester of salicylic acid (aspirin) and salicylamide (the amide of salicylic acid) and prepare tablets from this mixture in accordance with standard procedure.

A drug prepared in this manner fulfills the objects of our invention for the reason that the brain concentration curve of salicylamide is substantially complementary to the brain concentration curve of aspirin. In other words, the concentration curve of the amide starts at a relatively high point as compared with the aspirin curve, then rapidly drops and finally levels off. The additive effect of a combination of the two drugs therefore produces a substantially level straight line curve.

We have determined that, in comparison with other salicylates, salicylamide is absorbed as rapidly into the blood stream following oral administration, but is not bound by serum proteins to the same extent. Therefore, the salicylamide very rapidly distributes itself almost equally throughout all the body fluids, thus accounting for the quicker brain concentration. The salicylamide also is more rapidly excreted by the kidneys than is salicylate, thus accounting for the more rapid fall in brain salicylamide concentration. The pharmacological study of salicylamide and the salicylates, which afforded the data resulting in the invention of mixing substantially equal amounts of salicylamide and aspirin, has just been published by Seeberg (one of the co-inventors herein) and his assistants in the Journal of Pharmacology and Experimental Therapeutics, volume 101, March 1951, pages 275–282. The data showing how the brain concentrations of salicylamide and the salicylates complement each other following oral administration is clearly shown in the table on page 279. When similar experiments were conducted using a mixture of 0.25 gram of salicylamide and 0.25 gram of aspirin per dose, the salicylamide plus aspirin brain concentration remained almost constant for the period between one-half hour and five hours after oral administration.

We claim:

1. An analgesic composition comprising an admixture of salicylamide and the acetyl ester of salicylic acid.

2. An analgesic composition comprising substantially equal quantities of salicylamide and the acetyl ester of salicylic acid.

References Cited in the file of this patent

Pharmaceutical Abstracts, vol. 6, December 1940, page 525.

Hager: Pharmazeutischen Praxis, vol. 1 (1925), page 217.

Hart: Journal of Pharmacology, vol. 89, pages 205 to 209 (1947).